United States Patent

[11] 3,592,055

| [72] | Inventor | Frank D. Dorman |
| | | St. Paul, Minn. |
| [21] | Appl. No. | 798,756 |
| [22] | Filed | Feb. 12, 1969 |
| [45] | Patented | July 13, 1971 |
| [73] | Assignee | Thermo-Systems, Inc. |
| | | St. Paul, Minn. |

[54] DIRECTIONAL SENSOR
12 Claims, 12 Drawing Figs.

[52] U.S. Cl.................................................... 73/188,
73/204
[51] Int. Cl..................................................... G01w 1/02
[50] Field of Search........................................ 73/170,
188, 189, 194, 204

[56] References Cited
UNITED STATES PATENTS
1,902,427  3/1933  Sawyer..................... 73/204

| 2,870,305 | 1/1959 | Ling....................... | 73/204 X |
| 2,896,452 | 7/1959 | Cogniat.................. | 73/204 |
| 3,229,522 | 1/1966 | Benson................... | 73/204 |
| 3,352,154 | 11/1967 | Djorup.................. | 73/204 X |
| 3,498,127 | 3/1970 | Richards................ | 73/204 |

Primary Examiner—Richard C. Queisser
Assistant Examiner—C. E. Snee, III
Attorney—Burd, Braddock and Bartz ABSTRACT: A fluid flow sensing instrument having a hot-wire or hot-film sensor mounted on the end of a probe for measuring the velocity of the flowing fluid. The sensor is combined with transducers, as thermocouple junctions, for sensing nonuniform distribution of heat on the sensor and generating an EMF which indicates the velocity vector of the flowing fluid.

PATENTED JUL 13 1971
3,592,055
SHEET 1 OF 2
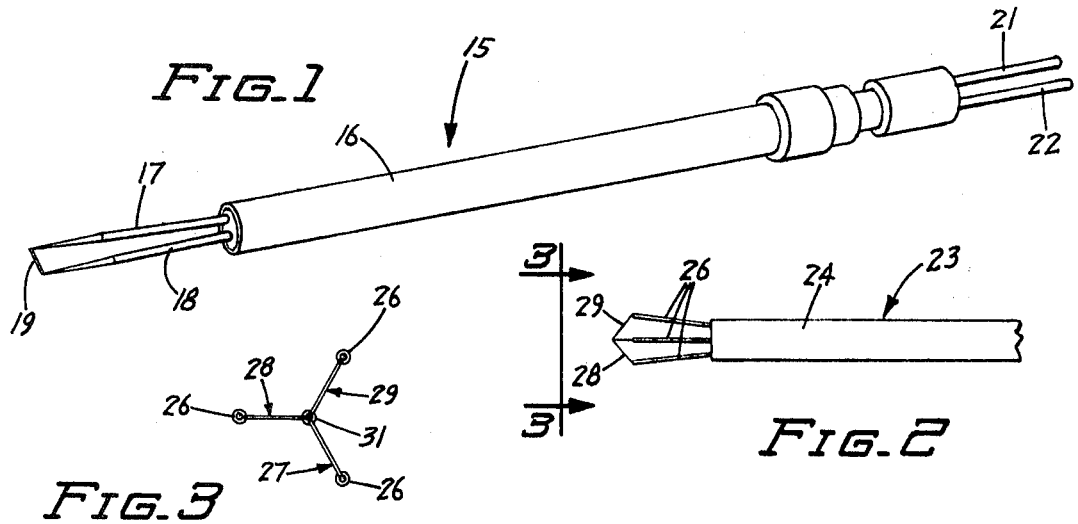
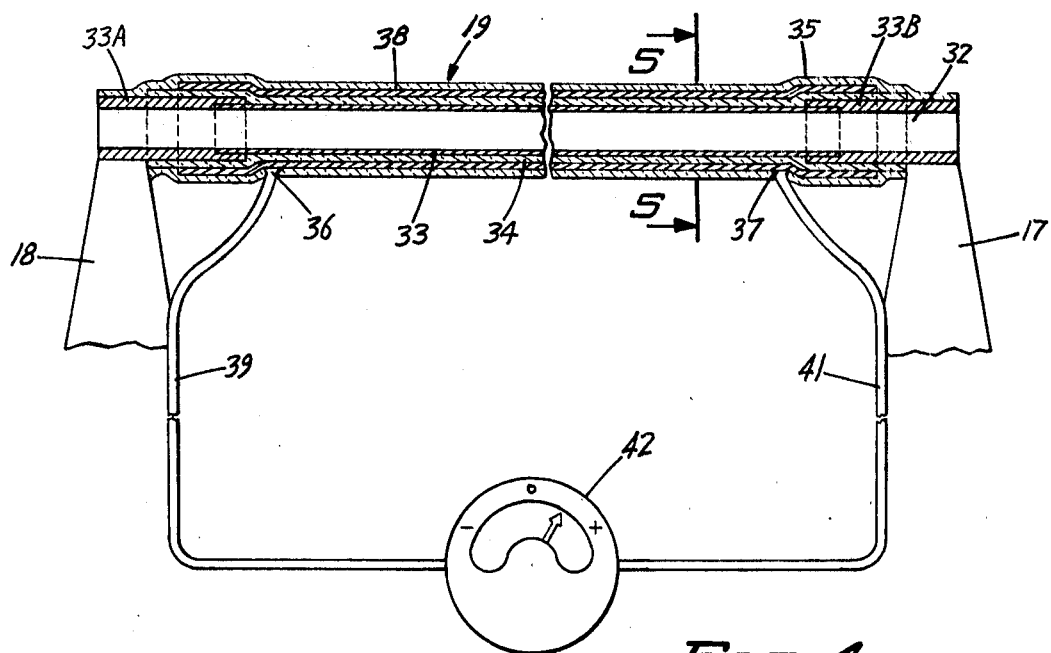
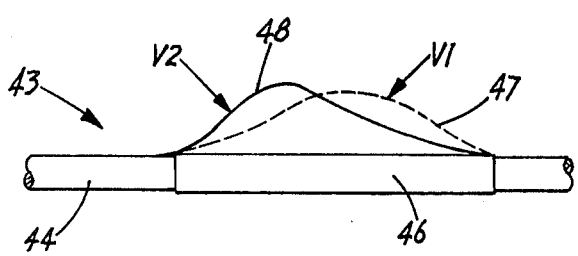
INVENTOR.
FRANK D. DORMAN
BY
Burd, Braddock & Bartz
ATTORNEYS

PATENTED JUL 13 1971

INVENTOR.
FRANK D. DORMAN
BY
Burd, Braddock & Bartz
ATTORNEYS 3,592,055

DIRECTIONAL SENSOR

BACKGROUND OF INVENTION

Sensing instruments having hot-wire or hot-film sensors have been developed for measuring fluid flow parameters, as velocity, mass flow, turbulence, pressure, and temperature, by sensing the heat transfer rate between an electrically heated sensor and the flow medium. These instruments are useful for measuring the velocity vector in a single octant. The response of the sensor to the fluid flow is sensed by a constant temperature anemometer circuit. This circuit measures the instantaneous heat transfer rate between the heated sensor and the fluid medium being measured. This type of instrumentation shown in U.S. Pat. Nos. 3,138,025 and No. 3,333,470 shows the instrument utilizing a constant temperature anemometer circuit having a bridge circuit in which the heated sensor is controlled at a constant resistance, and therefore, at a constant temperature. An amplifier senses any change in bridge balance due to flow changes and changes in electrical current through the bridge to control the sensor. The heated sensor measures the instantaneous heat transfer rate between the sensor and the fluid being measured. The heat transfer rate is a function of the flow of fluid over the sensor as well as the temperature of the fluid. The temperature effect is compensated for by using an additional sensor that measures temperature and corrects the anemometer output. This system, with proper calibration, measures fluid velocity when the sensor is exposed perpendicular to the mean velocity. Accordingly, its effective use depends on a previous knowledge of the direction of the mean velocity.

The present invention provides for accurate measurements of the instantaneous velocity vector in both magnitude and direction in three-dimensional flow fields. Techniques have been devised which measure the instantaneous velocity when the octant of the velocity vector in the 360° solid angle is known, as in wind tunnels and pipes. These techniques are not applicable in situations where the direction of the velocity vector of the flowing fluid in not known. Such a situation occurs in meterology and in other outdoor flow conditions in the inlet region of jet engines, near the blades of aircraft and helicopter propellers, in the wakes of aircraft and other objects in a flowing medium, etc.

SUMMARY OF INVENTION

The invention embodies structure and method of using the nonuniform temperature distribution on a sensor to generate an emf for a directional or velocity vector indication. The instrument is effectively useful to measure instantaneous three-dimensional wind velocity in meterology and other environments where the octant of the velocity vector in the 360° solid angle is not known. The measurement of velocity within the known octant is accomplished in the same manner as with a hot-wire or a hot-film sensor.

Opposite portions of the sensor are connected to separate transducers, as thermocouple junctions for measuring direction or the velocity vector. The shift in the temperature distribution along the sensor caused by the velocity vector of the moving fluid provides information as to the direction of the velocity vector from either side of normal to the hot-wire or hot-film sensor. As the direction of the velocity vector changes from the normal, one of the two transducers becomes hotter than the other. This provides a DC signal that can be utilized to trigger a flip-flop circuit that attaches the proper + or − sign to the velocity component being measured in a three-dimensional situation. In some cases, the magnitude of differential emf can be used to provide useful information on the direction of the velocity vector.

This sensor combination of heat transfer to measure fluid flow and of temperature distribution to sense direction can be used in a number of ways. For example, the sensor can measure flow independent of direction. Using the directional emf generated, the output can be corrected to read properly even though the velocity vector is not perpendicular to the sensor.

A prime application of this invention is the use of the directional sensor on each of three cylindrical hot-film sensors of a three-directional probe shown in FIGS. 2 and 3. Without directional sensors, the three sensor probe is only useful for measuring the velocity vector in a single octant. The emf generated by the direction sensor on each sensor detects octant changes. Therefore, except for interference by supports, a velocity detector is possible which has relatively high frequency response and measures the velocity vector over the entire 360° solid angle. This system is ideal for fast-response measurements of (1) meteorological turbulence, (2) three-dimensional wakes and jets, (3) flow near the blades of helicopters and other aircraft, (4) flow near the inlet of jet engines on aircraft, and (5) the flow around objects in the earth's boundary layer, such as ships, buildings and plants.

Another application of the invention involves orienting the axis of a single cylindrical sensor in the vertical direction. The cylindrical sensor will measure the horizontal component of velocity. The emf generated by the directional sensor will measure the deviation of the velocity vector from the horizontal and can be calibrated to measure the magnitude of the vertical velocity component.

In the drawings:

FIG. 1 is a perspective view of a probe having a sensor of the invention usable with a constant temperature anemometer circuit;

FIG. 2 is a fragmentary side view of a probe having three mutually perpendicular sensors with a common ground lead;

FIG. 3 is an end view taken along line 3–3 of FIG. 2;

FIG. 4 is an enlarged foreshortened view partly sectioned of the sensor of FIG. 1 connected to a voltmeter;

FIG. 5 is an enlarged sectional view taken along line 5–5 of FIG. 4;

FIG. 6 is a diagrammatic view showing the temperature profile on a cylindrical sensor;

Figure 7:
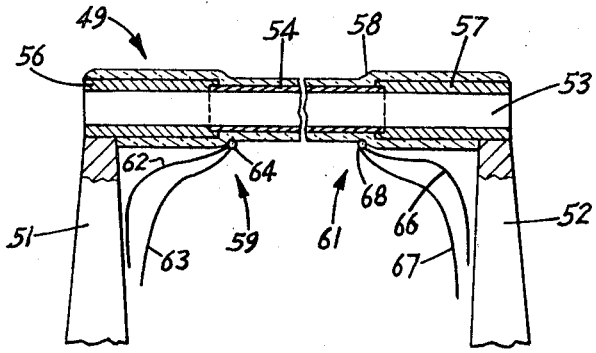
FIG. 7 is a foreshortened sectional view of another form of the directional sensor.

Referring to the drawings, there is shown in FIG. 1 a probe indicated generally at 15 having an elongated cylindrical body 16 comprising a casing of stainless steel enclosing core material, as a suitable electrical insulator as resin or ceramic. Extended through the core material and projected out of the forward end of the body are a pair of needlelike gold plated supports 17 and 18 having tapered forward ends. A sensor or sensing element indicated generally at 19 is connected to the ends of the supports 17 and 18. Sensor 19 includes a heated metal wire or film combined with temperature responsive transducers to provide signals as to both the velocity and the velocity vector or direction of the fluid flow past the sensor. Projected outwardly from the opposite end of the body are electrical contacts 21 and 22 adapted to be connected to controlling, measuring and recording apparatus usable with probe 15.

Referring to FIGS. 2 and 3, there is shown a three sensor probe 23 having a cylindrical body 24 carrying four outwardly directed supports 26. Three mutually perpendicular sensors 27, 28 and 29 connected to the supports and a common ground line 31. Each of the sensors includes temperature responsive transducers to sense the nonuniform distribution of heat on the sensor to generate an emf for directional indication.

Referring to FIGS. 4 and 5, there is shown a sensor 19 mounted on the ends of the supports 17 and 18. Sensor 19 comprises a transverse quartz rod 32 secured to the ends of supports 17 and 18. Surrounding the major portion of the midsection of the rod 32 is an internal cylindrical platinum film 33. The opposite ends of the platinum film 33 are coated with cylindrical gold films 33A and 33B. The platinum film and gold films are covered with a first thin film 34 of sputtered quartz. Located around film 34 between supports 17 and 18 is a thin external metal film or sleeve 38 covering the film. A second coat or film 35 of quartz covers the metal film 38. Leads 39 and 41 are attached at junctions 36 and 37 respectively to opposite end portions of metal film 38. The leads 39 and 41 are of a dissimilar thermocouple material from the material of film 38 to form a thermocouple type transducer. Leads 39 and 41 connected to the transducer junctions 36 and 37 respectively extend down the adjacent supports 17 and 18 and are connected to a volt meter 42 operable to indicate the sign of the DC voltage generated by the dissimilar materials of the film 38 and the leads 39 and 41. The voltage may be amplified before entering volt meter 42. The additional external metal film 38 placed over the quartz coating 34 together with the electrical leads 39 and 41 of dissimilar materials form at junctions 36 and 37 thermocouple type transducers. The term transducer is used as a generic term for a temperature sensing element which includes but is not limited to thermocouples, resistance thermometers utilizing wires or semiconductors, diode junctions and like temperature sensing elements.

The measurement of velocity is accomplished by holding the sensor film 33 at a constant temperature with a bridge circuit having an electronic feedback as disclosed in U.S. Pat. No. 3,333,470. The current is adjusted by changes in heat transfer between the sensor film 33 and the fluid environment with it is exposed. In the case where the sensor is hotter than the environment, as the heat transfer from the sensor film 33 to the environment increases, the current through the sensor film must increase to maintain the sensor film temperature. The thermocouple measurement is based on the nonuniform axial distribution of temperature on the film 38 which generates the thermocouple emf across the sensor film. The bridge circuit can only maintain the sensor film at a constant average resistance, therefore, at a constant average temperature. There is no feedback control of the axial temperature distribution along the sensor film. Adjacent to each end of the sensor film 38 are thermocouple junctions 36 and 37.

In a perfectly symmetrical sensor, the two thermocouple junctions at each end of the sensor 36 and 37 will be at identical temperatures when the fluid flow is perpendicular to the sensor. This is true independent of the flow velocity and type of fluid. When the flow is not perpendicular to the sensor, there is a nonuniform temperature distribution axially along the sensor. The skewed axial temperature distribution will cause one thermocouple junction to be hotter than the other. The two sensor ends then form the hot and cold junctions, respectively, of the thermocouple and an emf is generated. For a given velocity, the size of the emf depends on the angle between the flow vector and the sensor. The emf reverses polarity when the velocity vector passes from one side of the plane perpendicular to the sensor to the other side. This emf has the desirable property of acting as a directional sensor. In other words, the nonuniform distribution of heat on the sensor generates an emf for directional indications.

In the design of the sensor, it is desirable to keep the active length of the sensor long enough to maintain a low conduction loss to the supports. This is to avoid a nonuniform temperature distribution of the sensing surface. It is known that the temperature distribution along a cylindrical sensing element is not uniform near the supports. Applicant has made practical application of the phenomenon that the temperature distribution profile changes shape as the direction of the velocity vector changes with respect to a flow normal to the sensing surface. When the velocity vector is normal, the temperature distribution is symmetrical along the sensing surface. Referring to FIG. 6, there is shown a sensing element indicated generally at 43 comprising a cylindrical rod 44 having a temperature sensing film 46. This sensing element is illustrative of a hot-film sensor. The velocity vector V1 of the fluid is indicated by the temperature profile 48 or hot boundary layer. The profile shifts with a change in the direction of the velocity vector as indicated by velocity vector V2 and temperature profile 47. With the use of transducers attached to opposite ends of the sensor, the direction of the velocity vectors V1 and V2 can be determined.

Two approaches can be used to analyze the signals from a three sensor system. The three velocity sensing signals and the three transducer output signals can be fed into a computer which operates to determine the three components of velocity and a direction from the signals. The other approach is to use analog circuitry which computes the three velocity components instantaneously and reads out the proper signals for further analysis. Analog circuitry reduces the readings to a form which can be immediately checked to determine the operation and orientation of the probe before collecting data which in many cases requires waiting for analysis.

Referring to FIG. 7, there is shown a modification of the sensor indicated generally at 49 mounted on ends of space supports 51 and 52. The sensor 49 comprises a quartz rod 53 carrying a centrally located platinum film 54 and gold end films 56 and 57. Both films are covered with a quartz coating 58. Secured to the coating 58 adjacent end portions of the inside of the platinum film 54 are transducers indicated generally at 59 and 61 for sensing nonuniform axial temperature distribution on the film 54. Transducer 59 is a thermocouple having a line 62 and a second line 63 joined together at a bead 64 secured to the coating 58. The transducer 61 is a similar thermocouple comprising line 66 and line 67 joined together at a bead 68 secured to the coating 58. The beads 64 and 68 are spaced essentially an equal distance from the inner ends of gold films 57 and 56 respectively. The lines of each thermocouple are of dissimilar material to form a thermocouple junction.

Figure 8:
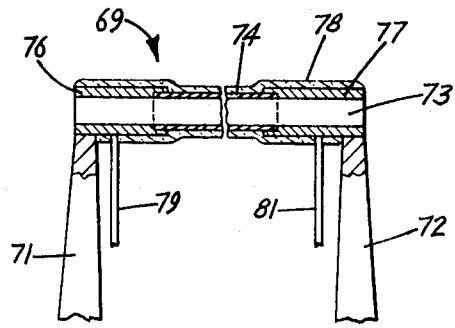
FIG. 8 is a foreshortened sectional view of yet another form of the directional sensor.

Referring to FIG. 8, there is shown a further modification of the sensor indicated generally at 69 mounted on a pair of spaced supports 71 and 72. The sensor 69 has an inner heat-flux sensing element 73 which includes a quartz rod, centrally located platinum film surrounding the rod and gold films engageable with opposite ends of the platinum film. Surrounding the midsection of the heat-flux sensing element is a film 74 of thermocouple material. Overlapping opposite ends of the film 74 are thermocouple films 76 and 77 of material dissimilar to the material of film 74. Located within thermocouple junctions are the annular contacts between the film 74 and the films 76 and 77. A quartz coating 78 surrounds both the film 74 and the films 76 and 77. The signals from the thermocouple junctions are sensed through leads 79 and 81 attached to films 76 and 77.

Figure 9:
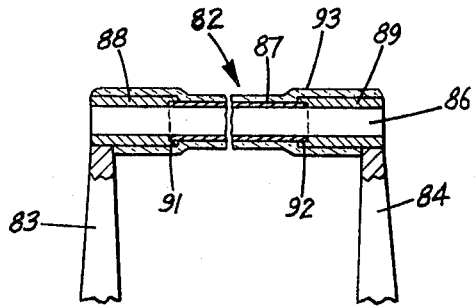
FIG. 9 is a foreshortened sectional view of a further form of the directional sensor.

Referring to FIG. 9, there is shown another sensor 82 mounted on the ends of separate supports 83 and 84. Sensor 82 has a transverse quartz rod 86 carrying a first film 87 of a material having combined thermocouple and heat-flux sensing characteristics. Surrounding the rod 86 adjacent opposite ends of the film 87 are films 88 and 89 of material that is dissimilar thermocouple material. The thermocouple junctions 91 and 92 are formed at the annular connections between the dissimilar films 87, 88 and 87, 89. All of the films are coated with a quartz coating 93.

Figure 10:
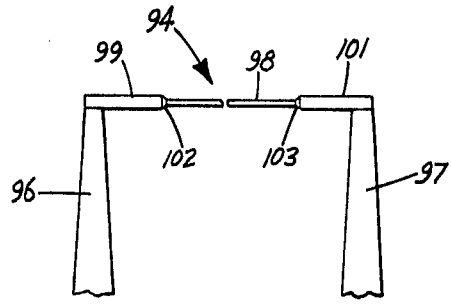
FIG. 10 is a foreshortened side view of a hot-wire directional sensor.

Referring to FIG. 10, there is shown a wire sensor indicated generally at 94 mounted on the ends of spaced supports 96 and 97. The wire sensor comprises a centrally located hot-wire 98 of a material which is suitable as both a thermocouple and as a heat-flux sensing element. Joined to the opposite ends of the wire 98 are rodlike members 99 and 101 of a material dissimilar to the material of wire 98. The junctions 102 and 103 between the wire 98 and the rods 99 and 101 are thermocouple junctions.

Figure 11:
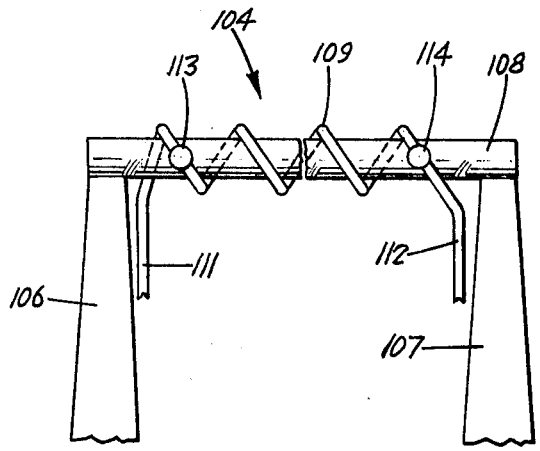
FIG. 11 is a foreshortened side view of another form of a hot-wire directional sensor.

Referring to FIG. 11, there is shown a further modification of the sensor indicated generally at 104 mounted on a pair of spaced supports 106 and 107. Sensing element 104 comprises a transverse quartz rod 108 carrying a wire 109 coiled about the rod. Opposite ends of the wire are secured to leads 111 and 112 of a dissimilar material. The junctions 113 and 114 between the ends of the wire 109 and the leads 111 and 112 form thermocouple junctions. The spiral wire is of a thermocouple material which has heat-flux sensing characteristics so that the spiral wire will operate to detect the velocity and the direction of the flowing fluid.

The sensors 82, 94 and 104 of FIGS. 9, 10, and 11, the hot-film 87, hot-wire 98 and hot-wire 109 must be operated by an AC control bridge to heat the sensor and to sense the velocity of fluid moving past the sensor. The emf generated by changes in the temperature distribution are picked up as a DC signal and used to measure direction or the velocity vector.

Figure 12:
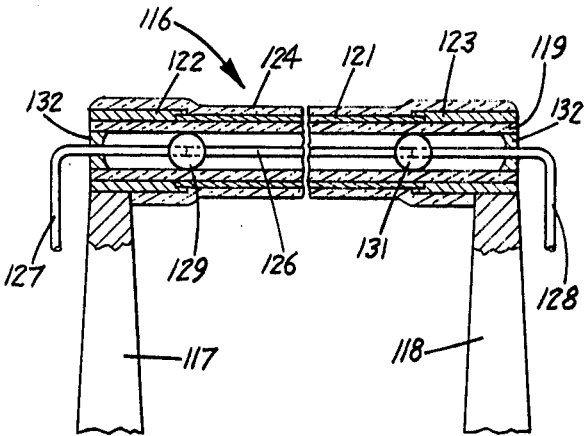
FIG. 12 is a foreshortened sectional view of still another directional sensor.

Referring to FIG. 12, there is shown still another modification of the sensor indicated generally at 116 mounted on the ends of spaced supports 117 and 118. Sensing element 116 has a transverse quartz tube 119 carrying a centrally located platinum film 121. Adjacent the opposite ends of 121 are second gold films 122 and 123. A quartz coating 124 covers both the platinum film and the gold film. Inside the tube 119 is a linear wire 126 of thermocouple material. Joined to opposite ends of the wire 126 are leads 127 and 128 of dissimilar material. The junctions 129 and 131 between the leads 127 and 128 and the wire 126 form thermocouple junctions. These junctions are located in general alignment with the ends of the platinum film 121. The opposite ends 132 and 133 of the tube 119 are closed about the leads 127 and 128 thereby enclosing and fixing the thermocouple junctions 129 and 131 with respect to the tube 119.

The sensors shown in FIGS. 4, 7, 8, 9 and 11 can also have a tubular rather than a solid rod for a substrate to improve the frequency response of directional indication.

The embodiments of the invention in which an exclusive property or privilege I claim are defined as follows:

1. A fluid properties sensor comprising: electrically conductive sensing material, means for supplying electrical current to the sensing material, a coating of nonconductive material on the surface of the sensing material, a metal film surrounding said coating, and transducer means associated with spaced portions of the sensing material to sense nonuniform distribution of heat on the sensing material, said transducer means comprising thermocouple junctions on opposite end portions of the metal film.

2. The sensor of claim 1 including: a second coating of nonconductive material covering the metal film and transducer means.

3. A fluid properties sensor comprising: electrically conductive sensing material, means supplying electrical current to the sensing material, a coating of nonconductive material on the outer surface of the sensing material, transducer means associated with portions of the sensing material to sense nonuniform distribution of heat on the sensing material, said transducer means comprising a first film surrounding the sensing material, and second films of dissimilar material from the first film joined to opposite ends of the first film, said first and second films being in contact with each other to form thermocouple junctions.

4. The sensor of claim 3 including: a second coating of nonconductive material covering the first film and the second films.

5. A fluid properties sensor comprising: electrically conductive sensing material comprising a wire having thermocouple material characteristics, a rod of electrically insulative material, said wire being spirally wound around said rod, and transducer means associated with spaced portions of the sensor material to sense nonuniform distribution of heat on the sensing material, said transducing means being members secured to portions of the wire, said members being of a material dissimilar to the wire material to form thermocouple junctions at the connections between the wire and the members.

6. A fluid properties sensor comprising: electrically conductive sensing material, a tubular member of nonconductive material, said electrically conductive sensing material secured to the midportion of said tubular member, means for supplying electrical current to the sensing material, and transducer means associated with spaced portions with the sensing material, said transducer means comprising in first wire of first thermocouple material located axially in said tubular member and second wires projected into the tubular member and joined into the ends of the first wire with connections to form spaced thermocouple junctions located within said tubular member, said second wires being of material dissimilar from the first wire.

7. The sensor of claim 6 wherein: the sensing material is a cylindrical member.

8. The sensor of claim 1 wherein: the sensing material is an elongated cylindrical member.

9. The sensor of claim 1 including: rod means carrying the electrically conductive sensing material, said sensing material being a film surrounding said rod means.

10. The sensor of claim 3 wherein: the sensing material is an elongated cylindrical member.

11. The sensor of claim 6 wherein: the electrically conductive sensing material is a film surrounding the tubular member.

12. The sensor of claim 11 including: a coating of nonconductive material covering the electrically conductive sensing material.